United States Patent
Kenney et al.

(10) Patent No.: US 9,357,437 B2
(45) Date of Patent: May 31, 2016

(54) METHODS AND ARRANGEMENTS FOR COMMUNICATIONS IN LOW POWER WIRELESS NETWORKS

(75) Inventors: Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,699

(22) PCT Filed: Dec. 30, 2011

(86) PCT No.: PCT/US2011/068254
§ 371 (c)(1),
(2), (4) Date: Feb. 28, 2014

(87) PCT Pub. No.: WO2012/148488
PCT Pub. Date: Nov. 1, 2012

(65) Prior Publication Data
US 2014/0185695 A1  Jul. 3, 2014

Related U.S. Application Data

(60) Provisional application No. 61/480,146, filed on Apr. 28, 2011.

(51) Int. Cl.
*H04L 27/20* (2006.01)
*H04W 28/06* (2009.01)
*H04L 27/26* (2006.01)

(52) U.S. Cl.
CPC ......... *H04W 28/065* (2013.01); *H04L 27/2601* (2013.01); *H04L 27/2613* (2013.01); *H04L 27/2643* (2013.01)

(58) Field of Classification Search
CPC .............. H04L 27/2647; H04L 5/0007; H04L 27/2092; H04L 27/2071; H04L 1/0003; H04L 1/0071; H04L 27/18; H04L 27/0008; H04L 27/2601; H04L 27/2613
USPC .................................. 375/260, 279, 295, 308
See application file for complete search history.

(56) References Cited

U.S. PATENT DOCUMENTS 7,711,061 B2   5/2010   Trachewsky
7,860,128 B2   12/2010  Niu
(Continued)

FOREIGN PATENT DOCUMENTS

CN   1874335 A     12/2006
CN   102027724 A   4/2011
(Continued)

OTHER PUBLICATIONS

International Search Report and Written opinion received for PCT Patent Application No. PCT/US2011/068254, mailed on May 30, 2012, 10 pages.
(Continued)

*Primary Examiner* — Ted Wang
(74) *Attorney, Agent, or Firm* — Schwegman Lundberg & Woessner, P.A.

(57) ABSTRACT

Embodiments may comprise an orthogonal frequency division multiplexing (OFDM) system operating in the 1 GHz and lower frequency bands. In many embodiments, the physical layer logic may implement repetition logic to repeat portions of the data streams to increase the ability of a receiving device to detect and decode the data streams. In some embodiments, the repetition logic may comprise a preamble repeater to repeat the training and/or signal fields. In further embodiments, the repetition logic may comprise a payload repeater to repeat the payload one or more times. Other embodiments comprise a receiving device comprising a correlator to correlate the repeated preamble symbols to detect a communication from a transmitting device. The receiving device may also comprise correction logic to correct data streams from the communications signal based upon repetitions of the payload in the data streams.

50 Claims, 5 Drawing Sheets

| | | | | | | | |
|---|---|---|---|---|---|---|---|
| PHYSICAL LAYER PROTOCOL DATA UNIT | | | | 1060 | | | |
| 8μs*N | 8μs*N*X | 8μs*N | 8μs*N*X | 8μs*N | 8μs*N*X | | |
| STF 1064 | STF * X 1065 | LTF 1066 | LTF * X 1067 | SIG 1068 | SIG* X 1069 | ADDITIONAL FIELDS 1070 | DATA 1072 |

PREAMBLE STRUCTURE 1062

(56) References Cited

U.S. PATENT DOCUMENTS

| | | | |
|---|---|---|---|
| 8,175,119 B2* | 5/2012 | Zhang et al. | 370/474 |
| 8,284,867 B2* | 10/2012 | Trachewsky et al. | 375/299 |
| 2005/0259758 A1 | 11/2005 | Razzell | |
| 2007/0047433 A1 | 3/2007 | Kao | |
| 2007/0104088 A1 | 5/2007 | Mujtaba | |
| 2008/0181320 A1 | 7/2008 | Asanuma et al. | |
| 2009/0122882 A1 | 5/2009 | Mujtaba | |
| 2009/0285339 A1 | 11/2009 | Zhang et al. | |
| 2010/0215080 A1 | 8/2010 | Hamaguchi et al. | |
| 2010/0220798 A1* | 9/2010 | Trachewsky | 375/260 |
| 2011/0013722 A1 | 1/2011 | Wu et al. | |
| 2011/0026639 A1 | 2/2011 | Rouquette-Leveil et al. | |
| 2011/0051747 A1 | 3/2011 | Schmidl et al. | |
| 2012/0002756 A1* | 1/2012 | Zhang et al. | 375/308 |
| 2012/0236971 A1* | 9/2012 | Taghavi Nasrabadi et al. | 375/340 |
| 2012/0263107 A1 | 10/2012 | Taghavi Nasrabadi | |
| 2012/0263141 A1 | 10/2012 | Taghavi Nasrabadi et al. | |
| 2012/0324315 A1 | 12/2012 | Zhang | |
| 2014/0140357 A1 | 5/2014 | Kenney et al. | |

FOREIGN PATENT DOCUMENTS

| | | | |
|---|---|---|---|
| CN | 102761986 A | 10/2012 | |
| EP | 1 480 362 A1 | 11/2004 | |
| EP | 1 548 958 A2 | 6/2005 | |
| EP | 1548958 A2 | 6/2005 | |
| EP | 2 702 734 A1 | 3/2014 | |
| EP | 2 748 947 A1 | 7/2014 | |
| JP | 2003-258757 A | 9/2003 | |
| JP | 2005-210690 A | 8/2005 | |
| JP | 2005210690 A | 8/2005 | |
| JP | 2005-328463 A | 11/2005 | |
| JP | 2005328463 A | 11/2005 | |
| JP | 2007-507967 A | 3/2007 | |
| JP | 2007507967 A | 3/2007 | |
| JP | 2008-500788 A | 1/2008 | |
| JP | 2008500788 A | 1/2008 | |
| JP | 2008-211752 A | 9/2008 | |
| JP | 2008211752 A | 9/2008 | |
| JP | 2012-235449 A | 11/2012 | |
| JP | 2014-511094 A | 5/2014 | |
| JP | 2014511094 A | 5/2014 | |
| WO | 2005114858 A1 | 1/2005 | |
| WO | 2005/034419 A1 | 4/2005 | |
| WO | 2005034419 A1 | 4/2005 | |
| WO | 2005/114858 A1 | 12/2005 | |
| WO | 2009/035076 A1 | 3/2009 | |
| WO | 2009035076 A1 | 3/2009 | |
| WO | 2012/148488 A1 | 11/2011 | |
| WO | 2012142612 A1 | 10/2012 | |
| WO | 2012142614 A1 | 10/2012 | |
| WO | 2012/158563 A1 | 11/2012 | |
| WO | 2013/028216 A1 | 2/2013 | |

OTHER PUBLICATIONS

Office Action received for Japanese Patent Application No. 2012-061803, mailed on May 14, 2013, 2 page of Office Action and 2 pages of English Translation.

Office Action Received for Japanese Patent Application No. 2012-061803, mailed on Dec. 10, 2013, 2 pages of Office Action and 2 pages of English Translation.

International Preliminary Report on Patentability and Written Opinion Received for PCT Patent Application No. PCT/US2011/068254, mailed on Nov. 7, 2013, 7 pages.

Office Action received for Japanese Patent Application No. 2012-061803, mailed on Aug. 12, 2014, 2 pages of English Translation and 1 pages of Office Action.

International Search Report and Written Opinion received for PCT Patent Application No. PCT/US2011/064674, mailed on Jul. 30, 2012, 9 pages.

International Preliminary Report on Patentability and Written Opinion received for PCT Patent Application No. PCT/US2011/064674, mailed on Mar. 6, 2014, 6 pages.

Office Action received for Chinese Patent Application No. 201210142400.7, mailed on Jun. 30, 2014, 11 pages of English Translation and 7 pages of Chinese Office Action.

Notice of Allowance received for Korean Patent Application No. 10-2013-7028987, mailed on Aug. 27, 2014, 1 page of English Translation and 2 pages of Korean NOA.

Office Action received for Korean Patent Application No. 2014-7004741, mailed on Sep. 26, 2014, 4 Pages of Office Action and 3 Pages of English Translation.

Shusaku Shimada, "Consultation Summary of Japanese 920MHz Band Rules and Conditions", IEEE 802.11-11/0974r2, Jul. 25, 2011, 23 pages.

Original Examiner's Report to the Appeal Board received for Japanese Patent Application No. 2012-061803, dated Dec. 4, 2014, 2 Pages of Report and 2 Pages of English Translation.

Extended European Search Report (including Supplementary European Search Report) for European Patent Application No. 11871143.1, dated Jan. 26, 2015, 8 pages.

Tim Schmidl, "Clause 6 OFDM PHY Draft", submitted Jan. 11, 2010 to Project IEEE P802.15 Working Group for Wireless Personal Area Networks (WPANs), IEEE P802.15g/D0.1, Jan., 2010 IEEE P802.15-10-0013-00-004g, 21 pages.

Notice of Final Rejection dated Apr. 27, 2015, in Korean Patent Application No. 2014-7004741 (3 pages), with 2 pages of English translation.

Notice of Allowance dated Jun. 2, 2015 in U.S. Appl. No. 13/977,553 (8 pages).

Corrected Notice of Allowability dated Jun. 25, 2015 in U.S. Appl. No. 13/977,553 (5 pages).

Notice of Allowance dated May 21, 2015 in U.S. Appl. No. 13/977,699 (2 pages).

Communication dated May 28, 2015 in U.S. Appl. No. 13/977,699 (2 pages).

Notice of Performing Pre-Appeal Review dated Jul. 14, 2015 in Japanese Patent Application No. 2014-525989 (1 page) with 1 page English translation.

Decision to Refuse dated Mar. 3, 2015 in Japanese Patent Application No. 2014-525989 (2 pages) with 3 page English translation.

Taghavi et al., "Introduction Submission for TGah," IEEE 802.11-11/0062r1, dated Jan. 16, 2011 (6 pages).

Notice of Reasons For Rejection dated Jul. 28, 2015 in Japanese Patent Application No. 2012-061803 (5 pages) with 6 page English translation.

Choi et al., "FPP-SUN Detailed Proposal," IEEE P802.15 Working Group for Wireless Personal Area Networks (WPANs), IEEE P802.15-15-09489-00-004g, Jul. 6, 2009 (35 pages).

Notice of Allowance in U.S. Appl. No. 13/977,553, dated Aug. 31, 2015 (14 pages with attachments).

Notice of Allowance in U.S. Appl. No. 13/977,699, dated Aug. 28, 2015 (16 pages with attachments).

Office Action in Chinese patent application No. 201210142400.7, dated Sep. 14, 2015 (9 pages, with 15 pages of organized English translation).

Office Action in Japanese patent application No. 2014-218327, dated Sep. 8, 2015 (3 pages, with 3 pages organized summarized English translation).

Choi et al., FPP-SUN Detailed Proposal, IEEE P802.15 Working Group for Wireless Personal Area Networks (WPANs), Jul. 6, 2009 (34 pages).

Porat, et al., Introductory TGah Proposal, IEEE 802.11-11/0069r1, Jan. 16, 2011 (12 pages).

Office Action received for Japanese Patent Application No. 2014-525989, mailed on Nov. 18, 2014, 2 Pages of Office Action and 2 Pages of English Translation.

Extended European Search Report (including Supplementary European Search Report) for European Patent Application No. 11864187.7, dated Feb. 9, 2015, 9 pages.

Choi, "FPP-SUN Detailed Proposal", IEEE P802.15-15-09-489-00-004g, submitted Jul. 16, 2009 to IEEE P802.15 Working Group for Wireless Personal Area Networks (WPANs), 31 pages.

(56) References Cited

OTHER PUBLICATIONS

Vermani, "Preamble Format for 1 MHz," IEEE 802.11/1482r2, submission dated Nov. 7, 2011, 30 pages.

Office Action mailed Feb. 11, 2015 for U.S. Appl. No. 13/977,553, 11 pages.

Communication pursuant to Rules 70(2) and 70a(2) EPC for European Patent Application No. 11871143.1, dated Feb. 12, 2015, 1 page.

Communication pursuant to Rules 70(2) and 70a(2) EPC for European Patent Application No. 11864187.7, dated Feb. 26, 2015, 1 page.

Office Action issued Mar. 4, 2015 in Chinese Patent Application No. 201210142400.7, (7 pages), with 11 pages of partial English translation.

Decision to Refuse issued Mar. 3, 2015 in Japanese Patent Application No. 2014-525989 (3 pages), with 3 pages of partial English translation.

Taghavi et al., "Introductory Submission for TGah," IEEE 802.11-11/0062r1, Jan. 16, 2011 (5 pages).

U.S. Appl. No. 61/475,814, filed Apr. 15, 2011, received by WIPO IB on Apr. 29, 2012 (60 pages).

European Application Serial No. 11864187.7, Communication Pursuant to Article 94(3) EPC mailed Feb. 29, 2016, 5 pgs.

\* cited by examiner

METHODS AND ARRANGEMENTS FOR COMMUNICATIONS IN LOW POWER WIRELESS NETWORKS

CROSS-REFERENCE TO RELATED APPLICATIONS

This application is a National Stage of prior International Application No. PCT/US2011/068254, filed 30 Dec. 2011, which claims the benefit of prior U.S. Provisional Application No. 61/480,146, filed 28 Apr. 2011.

BACKGROUND

Embodiments are in the field of wireless communications. More particularly, embodiments are in the field of communications protocols between wireless transmitters and receivers.

DETAILED DESCRIPTION OF EMBODIMENTS

Figure 1:
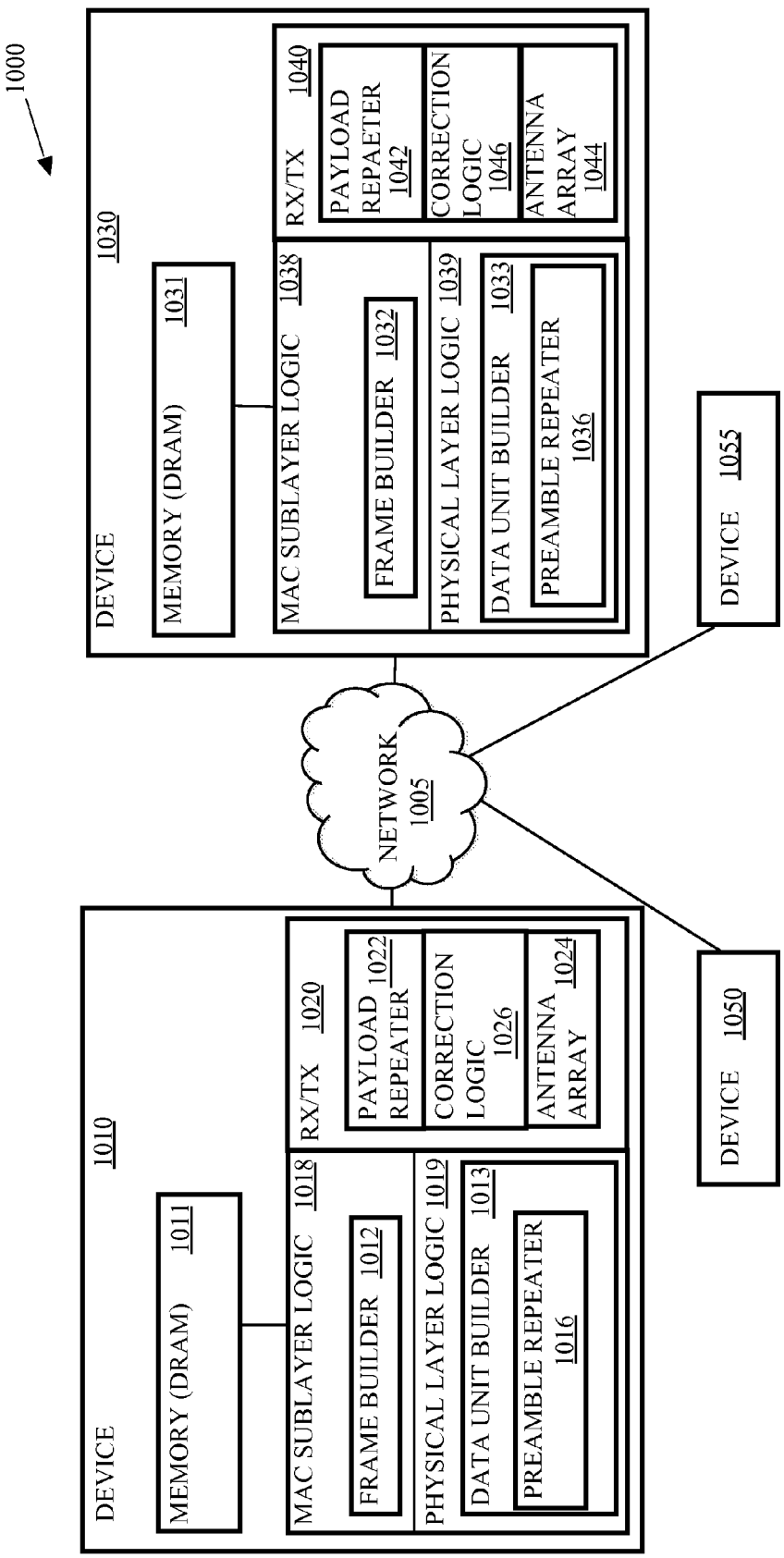
FIG. 1 depicts an embodiment of an example wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may comprise an orthogonal frequency division multiplexing (OFDM) system operating in the 1 GHz and lower frequency bands. In many embodiments, the physical layer logic may implement repetition logic to repeat portions of the data streams to increase the ability of a receiving device to detect and decode the data streams. In several embodiments, the repetition logic may increase the range for establishing and maintaining channels of communications between a transmitting device and a receiving device. In many embodiments, the range extension may be on the order of one kilometer.

In some embodiments, the repetition logic may comprise a preamble repeater to increase the integration time for the short training field by the correlator of the receiving device to increase the receiving device's ability to detect a communication signal from the transmitting device. In further embodiments, the repetition logic may comprise a preamble repeater to repeat the short training field a number of times such as two to five times. In further embodiments, the repetition logic may comprise a preamble repeater to repeat the long training field a number of times such as two to five times. In several embodiments, the repetition logic may comprise a preamble repeater to repeat the signature field a number of times such as two to five times. And, in still further embodiments, the repetition logic may comprise a preamble repeater to repeat additional long training fields in the preamble, which reside between the signal field and the payload for multi-stream antenna training, a number of times such as two to five times.

In some embodiments, the repetition logic may comprise a payload repeater. The payload repeater may repeat the payload one or more times such as two to five times. In many embodiments, the payload repeater may repeat the data in a bit stream of the physical layer device prior to interleaving and, in multi-stream embodiments, prior to stream parsing the data stream in the transmitter. In further embodiments, the payload repeater may repeat the OFDM symbols in the transmit chains prior to or after transforming the OFDM symbols to the time domain. In other embodiments, the payload repeater may implement a new modulation and coding scheme, such as binary phase shift keying with a coding rate of ¼ to effectively repeat the payload in the transmission of the communication signal in addition to the existing coding schemes in IEEE 802.11 n/ac systems.

Other embodiments comprise a receiving device comprising a correlator to correlate the multiple STF, LTF, and/or SIG symbols to detect a communication from a transmitting device. The receiving device may also comprise correction logic to correct data streams from the communications signal based upon multiple repetitions of the data in the data streams. In some embodiments, the receiving device may perform initial parameter estimation with the repetitions of the short training fields. In further embodiments, the receiving device may perform fine parameter estimation with the repetitions of the long training fields.

In the frequency bands of 1 GHz and lower, the available bandwidth is restricted, thus an IEEE 802.11n/ac type system that uses bandwidths of 20, 40, 80 and 160 MHz may not be practicable in some geographic regions. In many embodiments, the systems have bandwidths on the order of approximately 1 to 10 MHz. In several embodiments, an 802.11n/ac type system may be down-clocked to achieve lower bandwidths. For instance, many embodiments are down-clocked by N, such as 20, 40, 80 and 160 MHz divided by N, where N could take on a value of, e.g., 10, providing 2, 4, 8, and 16 MHz bandwidth operation. Embodiments may also implement a 1 MHz bandwidth by another method. In some embodiments, the tone counts for 2, 4, 8, and 16 MHz bandwidths may be based on those of IEEE 802.11ac systems. In other embodiments, the tone counts may be different from those IEEE 802.11ac systems, removing, for example, tone counts that are not unnecessary at the lower bandwidths.

Some embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Some embodiments reuse the IEEE 802.11n/ac system with new features that meet these lower data rate and ultra low power consumption requirements to reuse hardware implementations and to reduce implementation costs. Further embodiments accommodate multiple streams. Several embodiments do not implement legacy training fields and legacy signal fields and do not implement multi-user, Multiple Input, Multiple Output (MIMO). And some embodiments employ beamforming.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, 1050, and 1055 via the network 1005. The communications devices 1010, 1030, 1050, and 1055 may comprise sensors, stations, access points, hubs, switches, routers, computers, laptops, notebooks, cellular phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. The communications device 1030 may initiate communications with the metering substation to transmit data related to water usage and may reside a significant distance away from the communications device 1010.

The communications device 1030, when initiating communications with the communications device 1010, may repeat the short training field a number (STF) of times to extend the range at which the communications device 1010 can detect the STF via, e.g., a preamble repeater 1036. In several embodiments, the communications device 1010 may also repeat the long training field (LTF) and signal (SIG) field for a single stream as well as additional LTFs for multi-stream communications. Repetition of the LTF may offer improved parameter estimation for long-range communications such as frequency error, timing error, and channel estimation.

In many embodiments, the communications device 1030 may also repeat the payload, e.g., the data related to water usage, multiple times via a payload repeater 1042 to facilitate decoding of the data by the communications device 1010. The preamble repeater 1036 and the payload repeater 1042 may be generally referred to as repetition logic of the physical layer.

The communications device 1010 may comprise a correlator to integrate the signals received to detect an STF from the multiple STFs transmitted from the communications device 1030. And the communications device 1010 may comprise correction logic 1026 to utilize the multiple copies of the payload to determine an accurate representation of the payload.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, Media Access Control (MAC) sublayer logic 1018 and 1038, and physical layer logic 1019 and 1039, respectively. The memory 1011, 1031 such as Dynamic Random Access Memory (DRAM) may store the frames, preambles, and preamble structures, or portions thereof. The frames, also referred to as MAC layer Protocol Data Units (MPDUs), and the preamble structures may establish and maintain synchronized communications between the transmitting device and the receiving device.

The MAC sublayer logic 1018, 1038 may generate the frames and the physical layer logic 1019 may generate physical layer data units (PPDUs) based upon the frames. More specifically, the frame builders 1012 and 1032 may generate frames and the data unit builders 1013 and 1033 of the physical cal layer logic 1019 may generate PPDUs. The data unit builders 1013 and 1033 may generate PPDUs by encapsulating payloads comprising the frames generated by frame builders 1012 and 1032 to prefix the payloads to be transmitted over one or more RF channels via antenna arrays 1024 and 1044, respectively.

The data unit builders 1013 and 1033 may comprise preamble repeaters 1016 and 1036 respectively. The preamble repeaters 1016 and 1036 may facilitate extended range communications between devices such as the communications devices 1010 and 1030. The preamble repeaters 1016, 1036 may generate preambles with multiple, concatenated sequences of the STF, and in some embodiments, the long training fields (LTF), and the signal field. For example, the preamble repeater 1016, 1036 may generate a PPDU including a preamble that has, e.g., five concatenated sequences of the STF. In some embodiments, the preamble repeater 1016, 1036 may generate a preamble for the PPDU that comprises five STFs, five LTFs, and five signal fields. In other embodiments, a different number of STFs, LTFs, and signal fields may be included in the preamble of the PPDU.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

Each transceiver 1020, 1040 comprises an RF transmitter and an RF receiver. In the present embodiments, each RF transmitter comprises a payload repeater 1022, 1042 and each RF receiver comprises correction logic 1026, 1046. The payload repeater 1022, 1042 may comprise logic to include repetitions of the payload in a transmission of the PPDU. In some embodiments, the payload repeater 1022, 1042 may comprise a vector repetition logic to concatenate repetitions of data in a bit stream prior to the bit stream entering an interleaver and, if multiple bit streams, prior to the bit streams entering a stream parser.

In further embodiments, the payload repeater 1022, 1042 may comprise a symbol repetition logic to create more than one repetition of symbols in transmit chains either in the frequency domain prior to the transforming the symbols in the transmit chain to the time domain or in the time domain after such transformation. In other embodiments, the payload repeater 1022, 1042 may comprise a new modulation and coding scheme. The new modulation and coding scheme may comprise binary phase shift keying (BPSK) at a coding rate of ¼, effectively repeating the payload in code space.

The correction logic 1026, 1046 may provide logic in the receiver to take advantage of the repetitions of the payload in a communication signal. In particular, the correction logic 1026, 1046 may compare multiple versions of the payload received to determine an accurate version of the payload transmitted. In further embodiments, the correction logic 1026, 1046 may facilitate demodulation of the communication signal from the transmitter via BPSK at a coding rate of ¼.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. The wireless communication system 1000 of FIG. 1 is intended to represent an Institute for Electrical and Electronics Engineers (IEEE) 802.11ah system. Similarly, devices 1010, 1030, 1050, and 1055 are intended to represent IEEE 802.11ah devices.

In the present embodiment, the antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and is capable of communicating with IEEE 802.11ah devices.

Figure 1A:
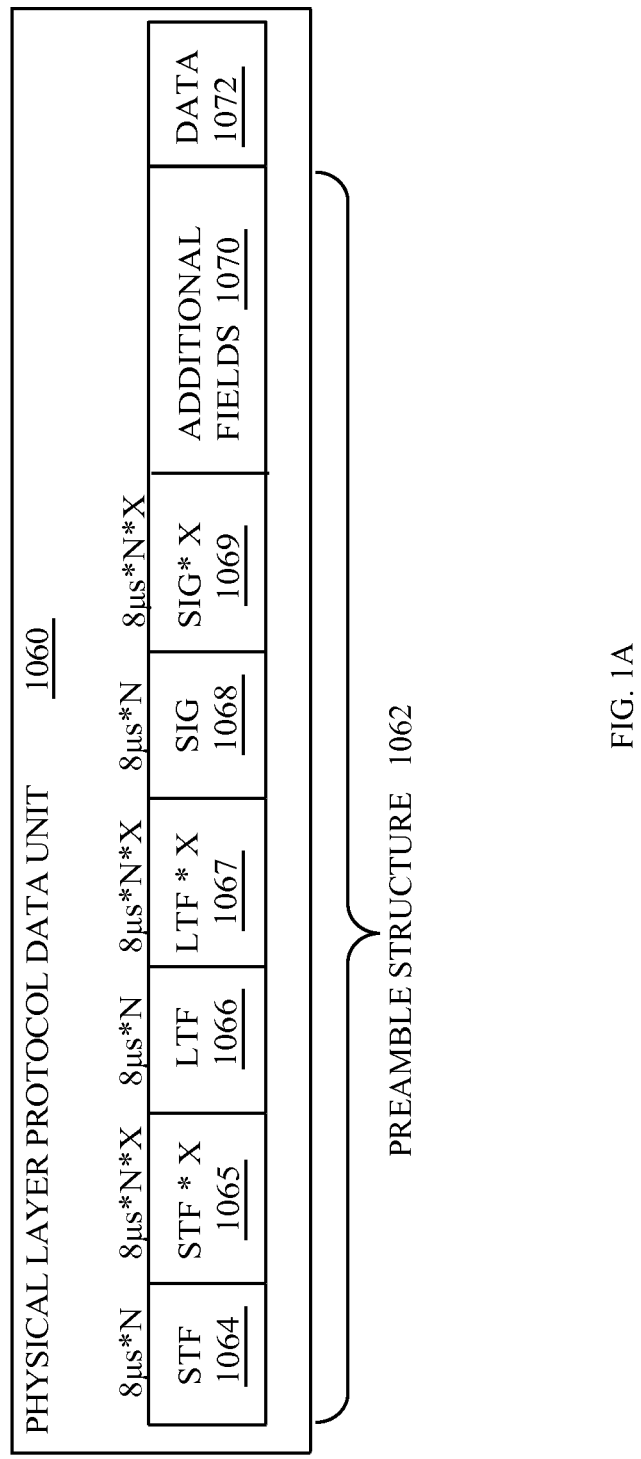
FIG. 1A depicts an embodiment of a physical layer protocol data unit generated by the short training field repeater logic of FIG. 1.

FIG. 1A depicts an embodiment of a physical layer protocol data unit (PPDU) 1060 with a preamble structure 1062 for establishing communications between wireless communication devices such as communications devices 1010. 1030, 1050, and 1055 in FIG. 1. The PPDU 1060 may comprise a preamble structure 1062 including orthogonal frequency division multiplexing (OFDM) training symbols for a single Multiple Input, Multiple Output (MIMO) stream followed by a signal field, followed by additional OFDM training symbols for additional MIMO streams, and the preamble structure 1060 may be followed by the data 1072 payload. In particular, the PPDU 1060 may comprise a short training field (STF) 1064 followed by X repetitions of the STF 1065, a long training field (LTF) 1066 followed by X repetitions of the LTF 1067, the signal field (SIG) 1068 followed by X repetitions of the SIG field 1069, and, in some embodiments, additional fields 1070 such as additional LTFs to support multiple streams. The preamble structure 1062 may be followed by data 1072, which is the payload of the PPDU 1060.

The STF 1064 may comprise a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1064 at a 20 MHz channel spacing is 8 μs times N. The STF*X 1065 may comprise one to four additional repetitions of the STF 1064 so the total time frame may be 8 μs times N times X. In some embodiments, the preamble structure 1062 may only include repetitions of the STF 1064 and not repetitions of the LTF 1066 and SIG field 1068. In further embodiments, the preamble structure 1062 comprises repetitions of the LTF 1066 and/or SIG field 1068. As illustrated in FIG. 1A.

The LTF 1066 may comprise a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1066 at a 20 MHz channel spacing is 8 μs times N. The LTF*X 1067 may comprise one to four additional repetitions of the LTF 1066 so the total time frame may be 8 μs times N times X.

The SIG field 1068 may comprise a guard interval (GI) symbol at 0.8 μs times N and signal field symbols at 7.2 μs times N. The additional fields 1070 may comprise, e.g., one or more LTF symbols for additional MIMO streams if needed at 4 μs times N at 20 MHz channel spacing. In some embodiments, the additional fields 1070 may also be repeated one or more times in the preamble structure 1062. For example, the additional fields 1070 may comprise additional LTF symbols for multi-stream antenna training and these additional LTF symbols may be repeated X times for a duration of 4 μs times N times X per LTF symbol.

The data 1072 may comprise one or more MAC sublayer protocol data units (MPDUs) and may include one or more GIs. For example, data 1072 may comprise one or more sets of symbols including a GI symbol at 0.8 μs times N at the 20 MHz channel spacing followed by payload data at 3.2 μs times N at the 20 MHz channel spacing.

Note that while the logic for the physical layer and MAC sublayer are illustrated as separate units interconnected with the transceivers, in some embodiments, the logic may be integrated with one or more other devices to implement the same functionality.

Figure 2:
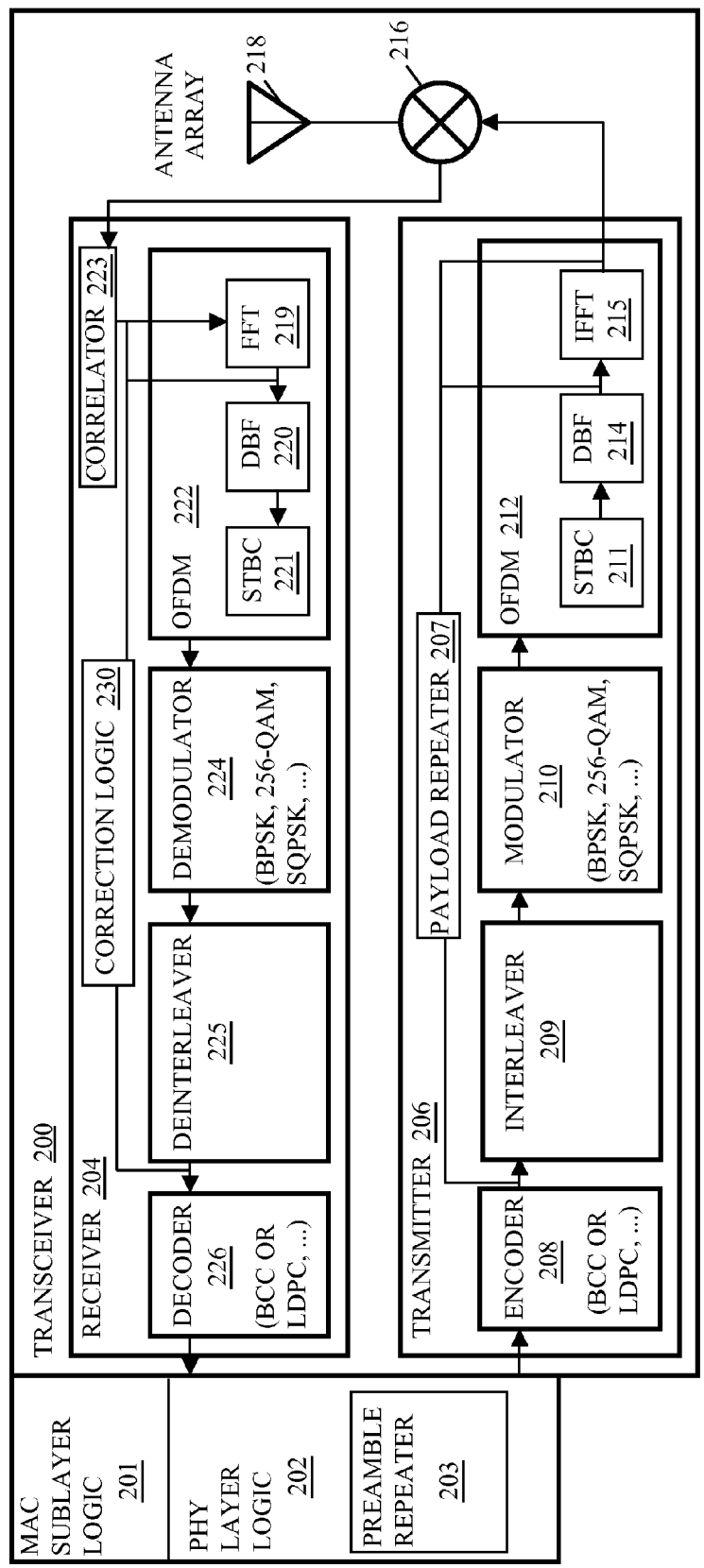
FIG. 2 depicts an embodiment of an apparatus to generate and transmit an Orthogonal Frequency Division Multiplexing (OFDM)-based communication in a wireless network.

FIG. 2 illustrates an embodiment of an apparatus to transmit an orthogonal frequency division multiplexing (OFDM)-based communication in a wireless network. The apparatus comprises a transceiver 200 coupled with Medium Access Control (MAC) sublayer logic 201 and physical layer logic 202. The MAC sublayer logic 201 may generate a frame and the physical layer logic 202 may encapsulate the frame (MPDU) with a preamble to generate a physical layer protocol data unit (PPDU) to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

A preamble repeater 203 of the physical layer logic 202 may repeat the symbols of the STF, LTF, and/or SIG fields in the preamble of the PPDU one or more times to extend the range at which the preamble may be detected and decoded by a receiving device. For example, the range extension is afforded by extending the number of sequences used in the STF. The new STF may be created by concatenating multiple sets of the time domain waveform. The STF time-domain sequence is given in the time domain as:
Error! Objects cannot be created from editing field codes.
Wherein
Error! Objects cannot be created from editing field codes. is the number of Transmit Antennas
Error! Objects cannot be created from editing field codes. is the number tones in the STF payload
Error! Objects cannot be created from editing field codes. is a windowing function
Error! Objects cannot be created from editing field codes. is a rotation function
Error! Objects cannot be created from editing field codes. is highest data subcarrier
Error! Objects cannot be created from editing field codes. is the subcarrier index
Error! Objects cannot be created from editing field codes. is the subcarrier frequency spacing In some embodiments, from three, up to five, of the time-domain sequences of the STF may be concatenated. Thus, an extended STF may be created by concatenating multiple symbols (time-domain sequences defined above). Three symbols may provide a total of 12 repetitions of the 160 sample sequence at 2 MHz. Up to five symbols may provide 20 repetitions of the 160 sample sequence. For the case of repeating the time-domain sequence 3 times, the final STF would be given by:
Error! Objects cannot be created from editing field codes.

The transceiver 200 comprises a receiver 204 and a transmitter 206. The transmitter 206 may comprise one or more of an encoder 208, an interleaver 209, a modulator 210, an OFDM module 212, and a payload repeater 207. Note that some embodiments include the preamble repeater 203 and do not include the payload repeater 207.

The encoder 208 of transmitter 206 receives data destined for transmission from the physical layer logic 202. The physical layer logic 202 may present data to transceiver 200 in blocks or symbols such as bytes of data. The encoder 208 may encode the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

In the present embodiment, the encoder 208 may implement a binary convolutional coding (BCC) or a low-density parity check coding (LDPC), as well as other encodings. The output of encoder 210 is fed to an interleaver 209 via one or more data streams. In some embodiments, a stream parser may reside between the encoder 208 and the interleaver 209 to parse the data into multiple data streams.

In many embodiments, the payload repeater 207 may reside or be implemented between the encoder 208 and the interleaver 209 to generate repetitions of the data stream, effectively generating adjacent repetitions of the payload of the PPDU from the physical layer logic 202. In some embodiments, the payload repeater 207 may comprise a repetition code. In the present embodiment, data in the bit stream just prior to the interleaver 209 is repeated. In further embodiments, the sequence bits of the data that is repeated may also be reversed in order. This approach allows for improved performance by putting the same encoded bits in different frequency bins and at different times in the transmitted packet. Thus affording both frequency and time diversity.

The interleaver 209 may interleave bits of the data stream, often referred to at this stage as spatial streams to prevent long sequences of adjacent noisy bits from entering a decoder at the receiver. The interleaver 209 may interleave the bits of data in the data stream by storing the data in rows of memory such as a buffer, a cache, or other memory. The interleaver 209 then outputs columns of the data. The columns may include a bit of data from each of the rows of data stored in the memory. The numbers of rows and columns is dependent upon the number of sub-carriers as well as the number of coded bits per single carrier (Nbpscs) for each spatial stream.

The modulator 210 of transmitter 206 receives data from the interleaver 209. A purpose of modulator 210 is to transform each block of binary data received from encoder 208 into a unique continuous-time waveform that can be transmitted by an antenna upon up-conversion and amplification. The modulator 210 impresses the received data blocks onto a sinusoid of a selected frequency. More specifically, the modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, the modulator 210 may implement Quadrature Amplitude Modulation (QAM) impressing two separate k-bit symbols from the information sequence onto two quadrature carriers, $\cos(2\pi ft)$ and $\sin(2\pi ft)$. QAM conveys two digital bit streams, by changing (modulating) the amplitudes of two carrier waves, using the amplitude-shift keying (ASK) digital modulation scheme. The two carrier waves are out of phase with each other by 90° and are thus called quadrature carriers or quadrature components. The modulated waves are summed, and the resulting waveform is a combination of both phase-shift keying (PSK) and amplitude-shift keying (ASK). A finite number of at least two phases and at least two amplitudes may be used.

In some embodiments, the modulator 210 maps the blocks of data received from encoder 208 uses four points on a constellation, equispaced around a circle, which is referred to as quadrature phase-shift keying (QPSK). With four phases, QPSK can encode two bits per symbol.

In another embodiment, the modulator 210 maps the blocks of data received from encoder 208 alternately on two channels or streams called the I channel (for "in phase") and the Q channel ("phase quadrature"), which is referred to as staggered quadrature phase-shift keying (SQPSK). SQPSK is a method of phase-shift keying in which the signal carrier-wave phase transition is 90 degrees or ¼ cycle at a time. A phase shift of 90 degrees is known as phase quadrature. A single-phase transition does not exceed 90 degrees. In SQPSK, there are four states: 0, +90, −90 and 180 degrees.

In yet another embodiment, the modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta = 2\pi(n-1)/n$ for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Such embodiments may use Binary Phase-Shift Keying (BPSK), the simplest form of phase-shift keying (PSK). BPSK uses two phases which are separated by 180° and is the most robust of all the PSKs since it takes the highest level of noise or distortion to make the demodulator reach an incorrect decision. In BPSK, there are two states for the signal phase: 0 and 180 degrees. The data is often differentially encoded prior to modulation.

In FIG. 2, the modulator 210 is coupled with payload repeater 207 to illustrate the inclusion of an additional modulation and coding scheme in some embodiments to effectively repeat data in the data stream one or more times for range extension. In such embodiments, the payload repeater 207 represents the implementation of BPSK at a coding rate of ¼. This modulation and coding scheme may offer the benefit of a strong code and thereby improved coding gain along with frequency and time diversity. In one embodiment, the code is created with the following generators (in octal) 135, 135, 147, and 163. As a comparison, the free distance of the current rate ½ code is 10, for this new rate ¼ code it is 20. Thus, the free distance has doubled using this new code.

The output of modulator 209 is fed to an OFDM module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers. In some embodiments, the OFDM 212 comprises the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. Between the STBC 211 and the IFFT 215, the payload repeater 207 may generate three to five repetitions of the OFDM symbols in the data streams in the frequency domain to improve the detection and decoding of the payload by, e.g., a repetition code whereby each OFDM symbol is repeated at the end of the transmitter block following the modulator 210. In several embodiments, this repetition is only implemented for the MCS0 configuration, namely the BPSK modulation with a code rate of ½. This approach may improve the signal-to-noise ratio (SNR) of the combined symbol by, e.g., 3 decibels (dB) over a single symbol. Since the symbol is repeated at or near the end of the transmit chain, the same bits will fall in the same frequency bins and the symbols will be adjacent to each other in time. In other embodiments, more or less repetitions of the symbols may be generated.

In the present embodiment, the IDFT may comprise the IFFT module 215, to perform an IFFT on the data. For example, at a 1 MHz bandwidth operation, the IFFT module 215 may perform a 32-point, inverse FFT on the data streams.

Between the IFFT 215 and, e.g., guard interval insertion, the payload repeater 207 may generate three to five repetitions of the OFDM symbols in the data streams in the time domain as an alternative to creating the repetitions in the frequency domain to improve the detection and decoding of the payload. This process may similarly repeat each OFDM symbol at or near the end of the transmitter block following the modulator 210. In some embodiments, this repetition is only implemented for the BPSK modulation with a code rate of ½.

The output of the IFFT module 215 may be up-converted to a higher carrying frequency or may be performed integrally with up-conversion. Shifting the signal to a much higher frequency before transmission enables use of an antenna array of practical dimensions. That is the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A+B) + \sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The transceiver 200 may also comprise diplexers 216 connected to antenna, array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, the diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using printed circuit board metallization technology. Microstrips, striplines, slotlines, and patches, for example, are all candidates for the antenna array 218.

The transceiver 200 may comprise a receiver 204 for receiving, demodulating, and decoding information bearing signals. The receiver 204 comprises a correlator 223 that may take advantage of the repeated symbols of the preamble such as repetitions of the STF, LTF, and/or SIG symbols. The correlator 223 may take advantage of the repeated symbols by integrating the incoming signals over the longer or extended period of time associated with the repeated symbols to detect the preamble of a communications signal from a transmitter such as the transmitter 206. The correlator 223 may compare the repetitions of the STF, LTF, and/or signal field symbols against known sequences for the STF, LTF and signal field to identify the preamble of the communication signal and, thus, detect the communication signal.

For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In many embodiments, the sensor determines a preamble with three to five repetitions of the STF sequence. In several embodiments, the sensor also generates the PPDU with repetitions of the payload to improve detection and decoding of the data collected by the sensor. The correlator 223 of the data collection station may then compare the three to five repetitions of the preamble against known sequences for the STF, LTF, and/or signal field to detect receipt of the transmission from the sensor.

The receiver 204 may comprise one or more of an OFDM module 222, a demodulator 224, a deinterleaver 225, a decoder 226, and correction logic 230. The OFDM 222 extracts signal information as OFDM symbols from the plurality of subcarriers onto which information-bearing signals are modulated.

The OFDM module 222 may comprise a fast Fourier transform (FFT) module 219, a DBF module 220, and an STBC module 221. The received signals are fed from antenna elements 218 to the FFT module 219 to transform the communication signals from the time domain to the frequency domain. In some embodiments, the correction logic 230 may receive multiple repetitions of the payload symbols and resolve errors in the symbols to determine error-corrected symbols based upon the repetitions of the symbols received by the receiver 204 either prior to or after the FFT module 219. The DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. In the present embodiment, the demodulator 224 is coupled with the correction logic 230 to represent that the demodulator 224 may comprise logic to demodulate a new modulation and coding scheme, BPSK at a code rate of ¼ in addition to the existing coding schemes in IEEE 802.11n/ac systems.

The demodulator 224 provides to the deinterleaver 225 a sequence of bits of information. The deinterleaver 225 may store the bits of data in columns and remove the data in rows to deinterleave the data. In some embodiments, the correction logic 230 may perform error correction on repetitions of data in the data stream after being output by the deinterleaver 225.

The decoder 226 decodes the received data from the demodulator 224 and transmits the decoded information, the MPDU, to the physical layer logic 202. In some embodiments, the correction logic 230 may perform error correction on the data streams.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, spatial mappers, cyclic shift insertion modules, guard interval insertion modules, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

Note that in many embodiments, the payload repeater 207 may be implemented at one location within the data streams such as prior to the interleaver 209, in the modulator 210, or in the OFDM 212 either before or after the IFFT 215. In other embodiments, the payload repeater 207 may be implemented in more than one location along the data streams. Similarly, the correction logic 230 may be implemented in one location in some embodiments such as before the FFT 219, after the FFT 219, in the demodulator 224, or after the deinterleaver 225. In other embodiments, the correction logic 230 may be implemented in more than one location.

Figure 3:
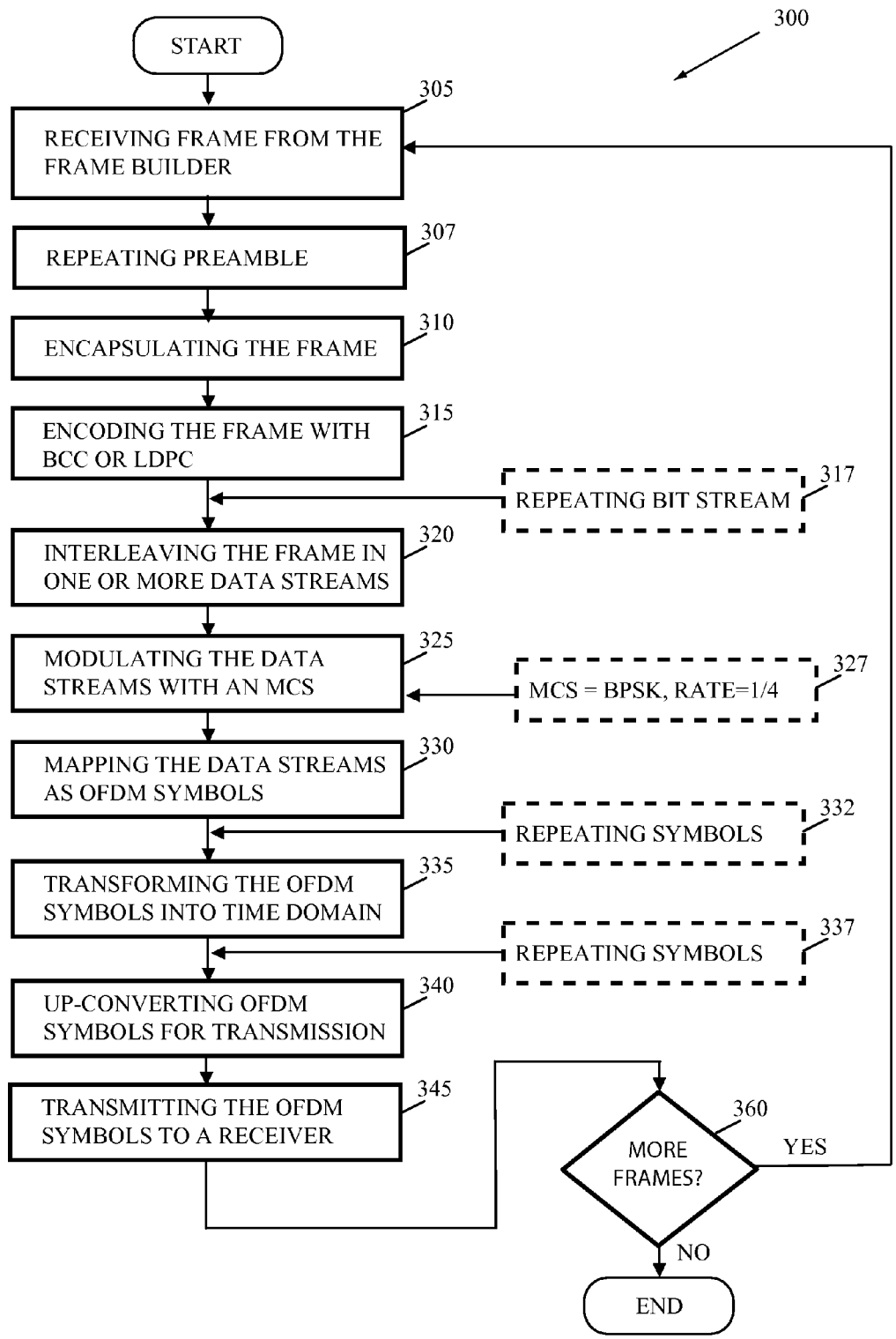
FIG. 3 depicts an embodiment of a flowchart to transmit communications with a transmitter as illustrated in FIG. 2.

FIG. 3 depicts an embodiment of a flowchart 300 to transmit communications with a transmitter as illustrated in FIG. 2. The flowchart 300 illustrates four alternative flows. In particular, elements 317, 327, 332, and 337 indicate four optional, alternative processes. In other embodiments, more than one of these alternative elements may be included in the same process.

The flowchart 300 begins with receiving a frame from the frame builder (element 305). The MAC sublayer logic may generate a frame to transmit to another communications device and may pass the frame as an MPDU to a data unit builder of the physical layer logic that transforms the data into a packet that can be transmitted to the other communications device. The data unit builder may generate a preamble, wherein preamble includes three to five concatenated repetitions of the STF, LTF, and/or SIG field sequences (element 307). The data unit builder may then use the preamble to encapsulate the PSDU (the MPDU from the frame builder) to form a PPDU for transmission (element 310). In some embodiments, more than one MPDU may be encapsulated in a PPDU.

The flowchart 300 continues with a transmitter such as transmitter 206 receiving a PPDU from physical layer logic. The transmitter may encode the PPDU with binary convolutional coding (BCC) or low-density parity check coding (element 315) for controlling errors in the transmission of the data. More specifically, the transmitter may encode the PPDU via one or more encoding schemes described in a preamble of the PPDU such BCC or LDPC.

After encoding the frame, in some embodiments, the transmitter may repeat the bit stream one or more times to provide payload repetition (element 317). In some embodiments, the transmitter may also generate the repeated sequence of the bits in the bit stream in a reversed order.

The transmitter may interleave the frame in one or more data streams (element 320). For example, an interleaver of the transmitter may receive the frame with data in multiple data streams from, e.g., a stream parser. The interleaver may then store the data from the data streams in rows of memory and output the data as data streams from columns of the memory, interleaving the bits of data for transmission.

The transmitter may modulate the data streams via a modulation and coding scheme indicated by the preamble such as BPSK, 16-QAM, 64-QAM, 256-QAM, QPSK, or SQPSK (element 325). For instance, a constellation mapper may map sequences of bits in the data stream to constellation points (complex numbers). In some embodiments, the transmitter may modulate the data streams with a BPSK modulation at a code rate of ¼ (element 327) to effectively repeat symbols of the payload.

The OFDM module of the transmitter may map the data streams of constellation points as OFDM symbols to transmit chains (element 330). For example, the OFDM module may comprise an STBC encoder to map the spatial streams of constellation points to space-time streams and a spatial mapper to map the space-time streams to transmit chains as OFDM symbols encoded with sub-carriers. The spatial mapper may provide direct mapping, wherein constellation points from each space-time stream are mapped directly onto the transmit chains (one-to-one mapping). The spatial mapping may provide spatial expansion, wherein vectors of constellation points from all the space-time streams are expanded via matrix multiplication to produce the input of OFDM symbols to all the transmit chains. Or the spatial mapper may provide DBF, wherein each vector of constellation points from all the space-time streams is multiplied by a matrix of steering vectors to produce OFDM symbols as input to the transmit chains.

In some embodiments, after mapping the data streams as OFDM symbols, the symbols may be repeated to include repetitions of the payload in the transmit chains (element 332) to extend the range of at which a receiver may effectively detect and decode the payload.

The transmitter may transform the OFDM symbols into the time domain via an inverse Fourier transform (element 335). In some embodiments, after transforming the symbols to the time domain, the symbols may be repeated to include repetitions of the payload in the transmit chains (element 337). Thereafter, the transmitter may up-convert the OFDM symbols for transmission (element 340) and transmit the OFDM symbols as a communication signal to the antenna(s) to transmit the signal to another communications device (element 345). If there are more frames to transmit (element 360), the process may start again at element 305.

Figure 4:
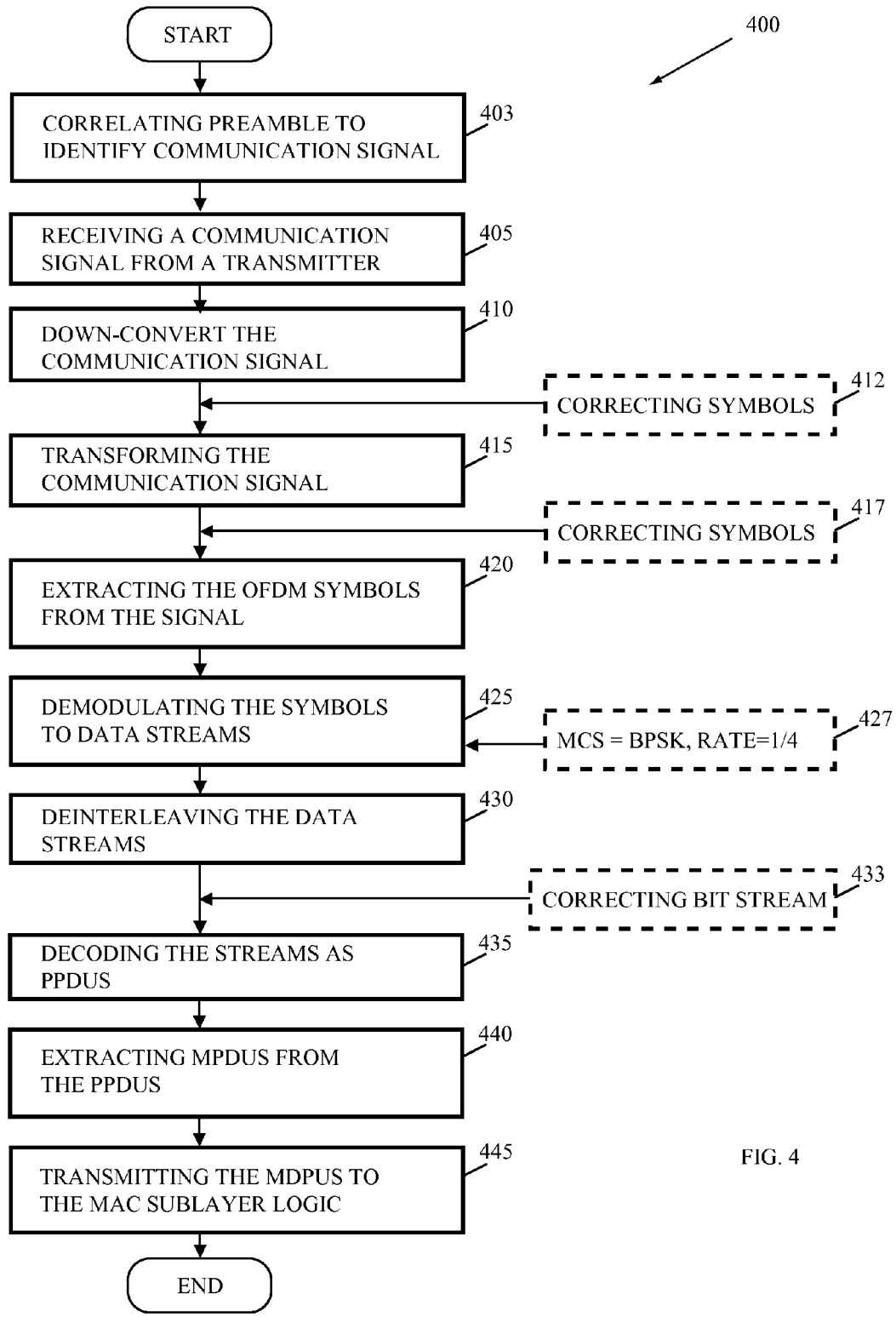
FIG. 4 depicts an embodiment of flowchart to receive communications with a receiver as illustrated in FIG. 2.

FIG. 4 depicts an embodiment of a flowchart 400 to detect and receive communications with a receiver as illustrated in FIG. 2. The flowchart 400 illustrates four alternative flows. In particular, elements 412, 417, 427, and 433 indicate four optional, alternative processes. In other embodiments, more than one of these alternative elements may be included in the same process.

The flowchart 400 begins with a receiver such as the receiver 204 detecting the communication signal by correlating the communication signal against known sequences of the preamble (element 403). The flowchart 400 continues with receiving a communication signal from a transmitter via one or more antenna(s) such as an antenna element of antenna array 218 (element 405). The receiver may down-convert the communication signal (element 410) to a lower frequency. Thereafter, in some embodiments, the receiver may perform error correction on the symbols of the payload, taking advantage of the repetitions of the payload to determine error-corrected symbols (element 412).

The receiver may transform the communication signal to the frequency domain via a FFT (element 415). In some embodiments, the receiver may perform error correction on the symbols of the payload after transforming the symbols to the frequency domain based upon the repetitions of the payload symbols (element 417).

The transmitter may extract the OFDM symbols from the communication signal (element 420) and demodulate the OFDM symbols to produce data streams of demodulated symbols (element 425). For instance, the demodulator such as the demodulator 224 demodulates the data streams via, e.g., BPSK, 16-QAM, 64-QAM, 256-QAM, QPSK, or SQPSK. In some embodiments, the demodulator may demodulate the data streams based upon a BPSK modulation at a code rate of ¼ (element 427).

The deinterleaver may receive the demodulated data streams and deinterleave the data streams by, e.g., storing the data in columns and removing the data in rows. In some embodiments, the receiver may, after deinterleaving the data stream, perform error correction on the data stream to correct for errors in repeated symbols in the data stream (element 433).

The decoder such as the decoder 226 may decode the data streams from the demodulator to determine the PPDUs (element 435) via, e.g., BCC or LDPC. The transmitter may then extract the MPDUs from the PPDUs (element 440) and transmit the MPDU to MAC sublayer logic such as MAC sublayer logic 201 (element 445).

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. A device usable to facilitate, at least in part, wireless communication, the device comprising:
    logic that comprises hardware, the logic to generate, at least in part, a preamble of a protocol data unit usable in the wireless communication, the protocol data unit to comprise the preamble and data;
    the preamble comprising a repeated short training field;
    the preamble also comprising a repeated long training field to follow the repeated short training field;
    the preamble further comprising one or more signal fields that follow the repeated short training field;
    the wireless communication, when in operation, to have a bandwidth of 1 megahertz and to use orthogonal frequency division multiplexing;
    the repeated short training field comprising two short training field repetitions;
    the repeated long training field comprising two long training field repetitions;
    each of the two repeated short training field repetitions and each of the two repeated long training field repetitions comprising a respective plurality of symbols;
    the two repeated short training field repetitions and the two repeated long training field repetitions to permit detection at the bandwidth of 1 megahertz;
    wherein:
    at the 1 megahertz bandwidth of the wireless communication, the repeated short training field and the repeated long training field, as transmitted, are to have first respective durations;
    at another bandwidth of the wireless communication that is greater by a factor of N compared to the 1 megahertz bandwidth, the repeated short training field and the repeated long training field are to have other respective durations that are decreased compared to first respective durations by the factor of N.

2. The device of claim 1, wherein:
    the protocol data unit is a physical layer protocol data unit and is to be modulated using:
    binary phase shift keying; or
    quadrature phase shift keying.

3. The device of claim 1, wherein:
    the logic is comprised, at least in part, in an integrated circuit chip;
    the device comprises a sensor to collect data;
    the device is to transmit the data to a data collector.

4. The device of claim 3, wherein:
    the data is related to health care-related monitoring.

5. The device of claim 3, wherein:
the data is related to usage of one or more services; and
the data collector comprises a usage meter substation.

6. The device of claim 1, wherein:
the data is to be comprised in a payload that is to be repeated in the wireless communication.

7. The device of claim 1, wherein:
the device further comprises:
at least one antenna; and
at least one memory;
a radio frequency transmitter; and
the at least one memory is to store machine-executable instructions that, when executed by a machine, result in generation of the preamble and the data.

8. An apparatus usable in wireless communication, the apparatus comprising:
a receiver to receive a preamble of a protocol data unit in the wireless communication, the protocol data unit, as received, comprising the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as received, have first respective durations;
at another bandwidth of the wireless communication that is greater by a factor of N compared to the 1 megahertz bandwidth, the repeated short training field and the repeated long training field have other respective durations that are decreased compared to first respective durations by the factor of N.

9. The apparatus of claim 8, wherein:
the protocol data unit is a physical layer protocol data unit and is modulated using:
binary phase shift keying; or
quadrature phase shift keying.

10. The apparatus of claim 8, wherein:
the receiver is comprised, at least in part, in an integrated circuit chip; and
the receiver is to be comprised in a data collector.

11. The apparatus of claim 10, wherein:
the data is related to health care-related monitoring.

12. The apparatus of claim 10, wherein:
the data is related to usage of one or more services; and
the data collector comprises a usage meter substation.

13. The apparatus of claim 8, wherein:
the data is to be comprised in a payload that is to be repeated in the wireless communication.

14. The apparatus of claim 8, wherein:
the apparatus further comprises:
at least one antenna; and
at least one memory; and
the receiver is a radio frequency receiver; and
the at least one memory is to store machine-executable instructions that, when executed by a machine, result in decoding of the preamble and the data.

15. At least one non-transitory memory storing machine-executable instructions that, when executed by a machine, result in operations comprising:
generating, at least in part, a preamble of a protocol data unit usable in wireless communication, the protocol data unit to comprise the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as transmitted, are to have first respective durations;
at another bandwidth of the wireless communication that is greater by a factor of N compared to the 1 megahertz bandwidth, the repeated short training field and the repeated long training field are to have other respective durations that are decreased compared to first respective durations by the factor of N.

16. The at least one memory of claim 15, wherein:
the protocol data unit is a physical layer protocol data unit and is to be modulated using:
binary phase shift keying; or
quadrature phase shift keying.

17. The at least one memory of claim 15, wherein:
the data is to be collected by a sensor; and
the data is to be transmitted to a data collector.

18. The at least one memory of claim 17, wherein:
the data is related to health care-related monitoring.

19. The at least one memory of claim 17, wherein:
the data is related to usage of one or more services; and
the data collector comprises a usage meter substation.

20. The at least one memory of claim 15, wherein:
the data is to be comprised in a payload that is to be repeated in the wireless communication.

21. At least one non-transitory memory storing machine-executable instructions that, when executed by a machine, result in operations comprising:
transmitting, by a transmitter, a preamble of a protocol data unit in wireless communication, the protocol data unit to comprise the preamble and data;
the preamble comprising a repeated short training field;

the preamble also comprising a repeated long training field to follow the repeated short training field;

the preamble further comprising one or more signal fields that follow the repeated short training field;

the wireless communication, when in operation, to have a bandwidth of 1 megahertz and to use orthogonal frequency division multiplexing;

the repeated short training field comprising two short training field repetitions;

the repeated long training field comprising two long training field repetitions;

each of the two repeated short training field repetitions and each of the two repeated long training field repetitions comprising a respective plurality of symbols;

the two repeated short training field repetitions and the two repeated long training field repetitions to permit detection at the bandwidth of 1 megahertz;

wherein:

at the 1 megahertz bandwidth of the wireless communication, the repeated short training field and the repeated long training field, as transmitted, are to have first respective durations;

at another bandwidth of the wireless communication that is greater by a factor of N compared to the 1 megahertz bandwidth, the repeated short training field and the repeated long training field are to have other respective durations that are decreased compared to first respective durations by the factor of N.

22. The at least one memory of claim 21, wherein:
the protocol data unit is a physical layer protocol data unit and is to be modulated using:
binary phase shift keying; or
quadrature phase shift keying.

23. The at least one memory of claim 21, wherein:
the transmitter is comprised, at least in part, in an integrated circuit chip;
the data is to be collected by a sensor;
the data is to be transmitted to a data collector.

24. The at least one memory of claim 23, wherein:
the data is related to health care-related monitoring.

25. The at least one memory of claim 23, wherein:
the data is related to usage of one or more services; and
the data collector comprises a usage meter substation.

26. The at least one memory of claim 21, wherein:
the data is to be comprised in a payload that is to be repeated in the wireless communication.

27. At least one non-transitory memory storing machine-executable instructions that, when executed by a machine, result in operations comprising:
receiving, by a receiver, a preamble of a protocol data unit in the wireless communication, the protocol data unit, as received, comprising the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as received, have first respective durations;
at another bandwidth of the wireless communication that is greater by a factor of N compared to the 1 megahertz bandwidth, the repeated short training field and the repeated long training field have other respective durations that are decreased compared to first respective durations by the factor of N.

28. The at least one memory of claim 27, wherein:
the protocol data unit is a physical layer protocol data unit and is modulated using:
binary phase shift keying; or
quadrature phase shift keying.

29. The at least one memory of claim 27, wherein:
the receiver is comprised, at least in part, in an integrated circuit chip; and
the receiver is to be comprised in a data collector.

30. The at least one memory of claim 29, wherein:
the data is related to health care-related monitoring.

31. The at least one memory of claim 29, wherein:
the data is related to usage of one or more services; and
the data collector comprises a usage meter substation.

32. The at least one memory of claim 27, wherein:
the data is to be comprised in a payload that is to be repeated in the wireless communication.

33. A method for use in association with wireless communication, the method comprising:
generating, at least in part, a preamble of a protocol data unit usable in the wireless communication, the protocol data unit to comprise the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as transmitted, are to have first respective durations;
at another bandwidth of the wireless communication that is greater by a factor of N compared to the 1 megahertz bandwidth, the repeated short training field and the repeated long training field are to have other respective durations that are decreased compared to first respective durations by the factor of N.

34. The method of claim 33, wherein:
the protocol data unit is a physical layer protocol data unit and is to be modulated using:
binary phase shift keying; or
quadrature phase shift keying.

35. The method of claim 33, wherein:
the data is to be collected by a sensor; and
the data is to be transmitted to a data collector.

36. The method of claim 35, wherein:
the data is related to health care-related monitoring.

37. The method of claim 35, wherein:
the data is related to usage of one or more services; and
the data collector comprises a usage meter substation.

38. The method of claim 33, wherein:
the data is to be comprised in a payload that is to be repeated in the wireless communication.

39. A method for use in association with wireless communication, the method comprising:
transmitting, by a transmitter, a preamble of a protocol data unit in wireless communication, the protocol data unit to comprise the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as transmitted, are to have first respective durations;
at another bandwidth of the wireless communication that is greater by a factor of N compared to the 1 megahertz bandwidth, the repeated short training field and the repeated long training field are to have other respective durations that are decreased compared to first respective durations by the factor of N.

40. The method of claim 39, wherein:
the protocol data unit is a physical layer protocol data unit and is to be modulated using:
binary phase shift keying; or
quadrature phase shift keying.

41. The method of claim 39, wherein:
the transmitter is comprised, at least in part, in an integrated circuit chip;
the data is to be collected by a sensor;
the data is to be transmitted to a data collector.

42. The method of claim 41, wherein:
the data is related to health care-related monitoring.

43. The method of claim 41, wherein:
the data is related to usage of one or more services; and
the data collector comprises a usage meter substation.

44. The method of claim 39, wherein:
the data is to be comprised in a payload that is to be repeated in the wireless communication.

45. A method for use in association with wireless communication, the method comprising:
receiving, by a receiver, a preamble of a protocol data unit in the wireless communication, the protocol data unit, as received, comprising the preamble and data;
the preamble comprising a repeated short training field;
the preamble also comprising a repeated long training field to follow the repeated short training field;
the preamble further comprising one or more signal fields that follow the repeated short training field;
the wireless communication, when in operation, to have a bandwidth of 1 megahertz and to use orthogonal frequency division multiplexing;
the repeated short training field comprising two short training field repetitions;
the repeated long training field comprising two long training field repetitions;
each of the two repeated short training field repetitions and each of the two repeated long training field repetitions comprising a respective plurality of symbols;
the two repeated short training field repetitions and the two repeated long training field repetitions to permit detection at the bandwidth of 1 megahertz;
wherein:
at the 1 megahertz bandwidth of the wireless communication, the repeated short training field and the repeated long training field, as received, have first respective durations;
at another bandwidth of the wireless communication that is greater by a factor of N compared to the 1 megahertz bandwidth, the repeated short training field and the repeated long training field have other respective durations that are decreased compared to first respective durations by the factor of N.

46. The method of claim 45, wherein:
the protocol data unit is a physical layer protocol data unit and is modulated using:
binary phase shift keying; or
quadrature phase shift keying.

47. The method of claim 45, wherein:
the receiver is comprised, at least in part, in an integrated circuit chip; and
the receiver is to be comprised in a data collector.

48. The method of claim 47, wherein:
the data is related to health care-related monitoring.

49. The method of claim 47, wherein:
the data is related to usage of one or more services; and
the data collector comprises a usage meter substation.

50. The method of claim 45, wherein:
the data is to be comprised in a payload that is to be repeated in the wireless communication.

* * * * *